United States Patent Office 3,778,455
Patented Dec. 11, 1973

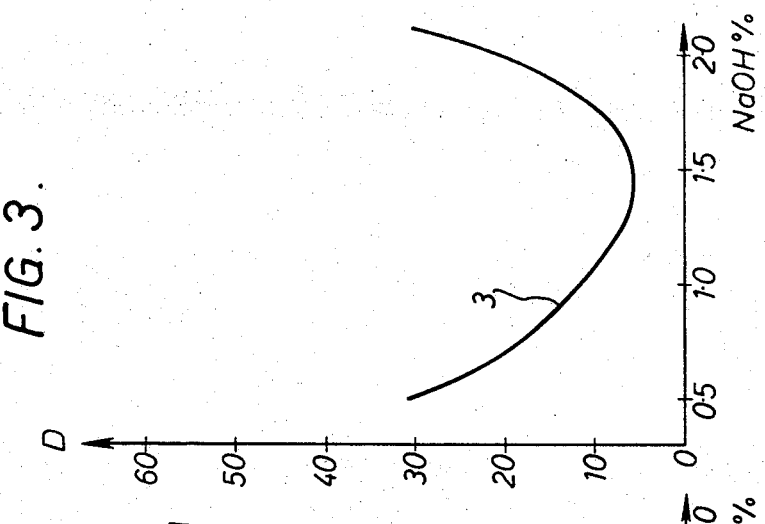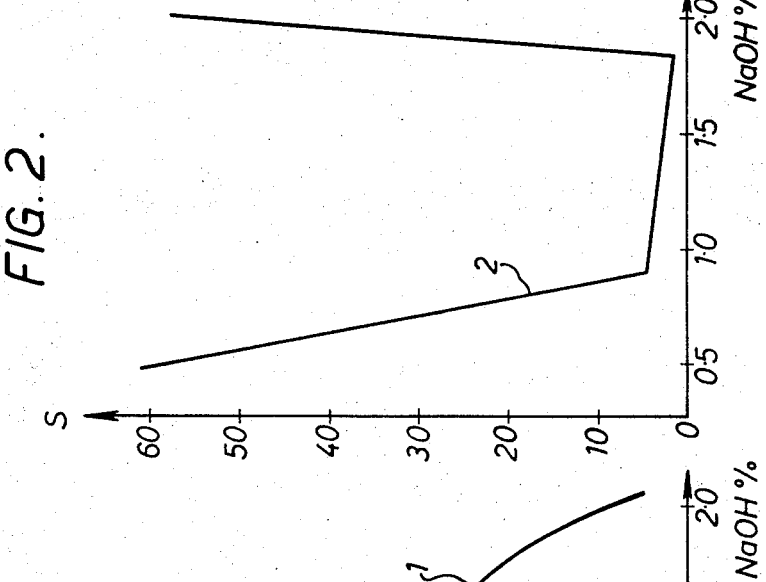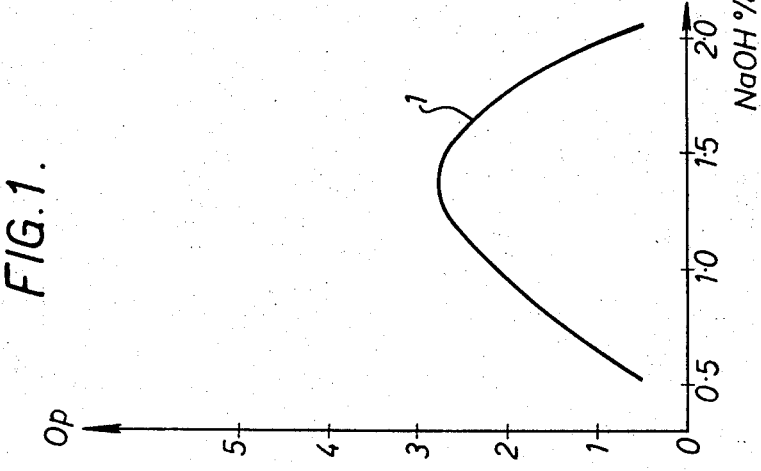

3,778,455
SYNTHETIC CARBOXYLIC ACIDS OF HIGH
MOLECULAR WEIGHT
Pierre James Bernard, Mont-Saint-Aignan, France, assignor to Esso Research and Engineering Company, Linden, N.J.
Filed Mar. 26, 1970, Ser. No. 22,814
Claims priority, application France, Mar. 28, 1969, 6909388
Int. Cl. C08h 17/36
U.S. Cl. 260—413     5 Claims

ABSTRACT OF THE DISCLOSURE

Synthetic carboxylic acids of high molecular weight are made by a process in which a halogen is reacted with a mixture of a polyolefin, unsaturated nitrile (e.g. acrylonitrile), and water. The polyolefin can be a $C_2$ to $C_5$ mono-olefin polymer having a molecular weight of between about 377 and 3000. Also the acid thus prepared can be used as an anionic emulsifier in a bitumen emulsion.

---

The present invention relates to a process for making synthetic carboxylic acids of high molecular weight, and their application as anionic emulsifiers for bitumens.

It is well known that to prepare monocarboxylic acids of high molecular weight it is possible to condense an alpha-beta unsaturated monocarboxylic acid containing 3 to 8 carbon atoms, with a halogenated $C_2$–$C_5$ mono-olefin polymer having a molecular weight of between 600 and 3000 and halogenated with 1 to 2 atoms of halogen per molecule of olefin polymer.

This process has the drawback of using expensive carboxylic acids.

The present invention avoids this drawback by providing a method of making synthetic carboxylic acids of high molecular weight in which nitriles are used in place of unsaturated monocarboxylic acids.

The process consists essentially of causing a halogen to act on a mixture of polyolefin, unsaturated nitrile, and water, or alternatively a halogenated polyolefin is reacted with an unsaturated nitrile and water.

As polyolefin one can preferably use a $C_2$–$C_5$ mono-olefin polymer having a molecular weight between about 377 and 3000 and more especially polypropylene or polyisobutylene of this type, or in the alternative process one can use the corresponding halogenated polyolefins.

The preferred nitrile is acrylonitrile, although other higher molecular weight unsaturated nitriles may be used.

The preparation as illustrated for chlorine, can be carried out under the following conditions:

Chlorine is bubbled into the mixture of polyolefin, nitrile and water at the ambient temperature, e.g. for about two hours. The reaction is exothermic and the temperature rises to about 100° C., then falling slightly. The reaction mixture is then heated with reflux for several hours to a fairly high temperature to further the polymerization reaction and so that there may be no further reactants that have not reacted. Hydrochloric acid is liberated and the synthetic carboxylic acid is collected in the form of a viscous liquid; it separated from the ammonium chloride either by merely washing in water or by centrifuging or decanting.

In this preparation one uses from 1 to 2 moles of chlorine and for preference from 1 to 1.5 moles for:

0.5 to 15 moles polyolefin and preferably 0.9 to 1.1 moles
1 to 2 moles of nitrile and preferably from 1 to 1.2 moles
2 to 4 moles of water and preferably from 2 to 2.4 moles.

A crude product is thus obtained which is a good emulsifier for bitumen, especially in proportions in the region of 1 to 1.5% by weight based on the weight of the emulsion.

One can use emulsions preferably containing quantities of caustic soda representing 0.9 to 1.8% by weight based on the weight of the emulsion, or corresponding quantities of other alkali metal or alkaline earth metal bases.

Alternatively, one can react the product (carboxylic acid) with a polyamine, such as tetraethylene pentamine, to make an ashless dispersant for lubricating oils.

EXAMPLE (1) Chlorine was bubbled for two hours into a mixture of polypropylene (M.W.=377), acrylonitrile and water, in the proportion of 1 mole of chlorine to 1 mole of polypropylene, 1 mole of nitrile and 2 moles of water.

After two hours the temperature had risen from 20 to 100° C. The reaction mixture was then heated with reflux for seven hours to a temperature of 220° C.

The hydrochloric acid was liberated; the ammonium chloride was dispersed in the product, and the raw polypropenylpropionic acids collected. By stirring with water, followed by decanting and finally drawing off the aqueous phase, the acids washed in water were obtained.

The polypropenylpropionic acids showed the following characteristics:

|  | Raw | Washed in water |
|---|---|---|
| Polypropenylpropionic acids: |  |  |
| Percent by weight: |  |  |
| C | 74.1 | 81.2 |
| H | 11.2 | 12.0 |
| O | 5.0 | 4.2 |
| N | 2.1 | 0.2 |
| Cl | 7.6 | 2.4 |
| Acid number (ASTM D 664) | 139 | 48 |
| Mean molecular weight (thermoelectric osmometry) | 730 | 710 |

(2) A bitumen was used having the following composition and characteristics.

Composition:                     Percent by weight
Tia Juana:
    Bitumen 0/10 _____ 13.5
    Bitumen 20/30 _____ 26.5
    Extract _____ 11.5
Middle East:
    Bitumen 5/15 Aramco _____ 36
    Extract _____ 12.5

ANALYSIS

Penetration 25° C./100 g./5 sec. (ASTM D 5) __ 214
Softening point ° C. (ASTM D 36) _____ 37
Density at 25° C. (ASTM D 71) _____ 1.021
Acid number (mg./KOH/g.) (ASTM D 664) ___ 0.4
Ductility at 25° C. (cm.) (ASTM D 113) _____ 130
Inflammability open cup ° C. (ASTM D 92) ____ 292
Volatility at 163° C./50 g./sec. (ASTM D 6) ____ 0.08
Penetration of residue at 25° C. (ASTM D 6) __ 167

For making the emulsions, a mixer was used consisting of a rotor 60 mm. in diameter, fitted with 5 blades and a stator 90 mm. in diameter formed by three rows of spindles; the diameter of the pan was 120 mm. and the useful height 60 mm., total capacity of the apparatus 600 ml.

The procedure was as follows:

The emulsifier was mixed with the bitumen at 130° C., 300 g. of this mixture were placed in the tank of the mixer and then cooled to 110° C.

300 g. of an aqueous soda solution, preheated to 80° C., were placed in this tank. The latter was at once fitted to the mixer and the mixture was stirred for exactly one minute at 2950 r.p.m.

The emulsion obtained was collected after standing for 3 minutes and then stored.

Emulsions with 50% bitumen were prepared with 1% by weight emulsifier based on the weight of the bitumen.

The measurements of opacity, sedimentation and decantation were carried out 7 days after the commencement of storage, according to the methods described in the work: "Bitumen Emulsions" published by the Association of Manufacturers of Road Bitumen Emulsions—1966 edition (method No. 1, decantation-sedimentation p. 59 and measurement of opacity, pp. 67 and 68).

The results of these measurements are entered on the graphs of FIGS. 1 to 3 attached, on which there have been entered on the abscissa the quantities of soda in parts by weight per 1000 parts of emulsion (NaOH%) and on the ordinates respectively:

in FIG. 1 the opacity (Op) after 24 hours (curve 1)
in FIG. 2 the sedimentation (S) after 7 days (curve 2)
and in FIG. 3 the decantation (D) after 7 days, for an Engler viscosity of the emulsions at 20° C. equal to 2.2 (curve 3).

It thus appears that very good emulsions are obtained with quantities of emulsifiers in the region of 1% by weight based on the weight of bitumen with at the same time quantities of caustic soda varying between 0.9 and 1.8% by weight based on the weight of the emulsion.

What is claimed is:

1. A process for preparing a high molecular weight monocarboxylic acid which comprises contacting a mixture of acrylonitrile, water and a $C_2$ to $C_5$ mono-olefin polymer of between about 377 and 3000 molecular weight with chlorine at a temperature between about 20° C. and about 100° C., thereafter heating the mixture under reflux until release of hydrogen chloride is essentially complete, and recovering the resulting monocarboxylic acid.

2. Process as defined by claim 1 wherein said olefin polymer is polypropylene.

3. Process as defined by claim 1 wherein said olefin polymer is polyisobutylene.

4. Process as defined by claim 1 wherein the reactants are employed in the proportions of 1 to 2 moles of chlorine, 0.5 to 1.5 moles of olefin polymer, 1 to 2 moles of acrylonitrile, and 2 to 4 moles of water.

5. Process as defined by claim 4 wherein said proportions are within the range of 1 to 1.5 moles of chlorine, 0.9 to 1.1 moles of olefin polymer, 1 to 1.2 moles of acrylonitrile, and 2 to 2.4 moles of water.

References Cited

FOREIGN PATENTS 692,679 6/1953 Great Britain _____ 260—413

OTHER REFERENCES

Migrdichian: Chemistry of Organic Cyanogen Compounds (1947), monograph series, No. 105, p. 37.

LEWIS GOTTS, Primary Examiner

E. G. LOVE, Assistant Examiner

U.S. Cl. X.R.

106—277